(12) United States Patent
Maxwell

(10) Patent No.: US 11,642,610 B2
(45) Date of Patent: May 9, 2023

(54) VORTEX INDUCING DEVICE AND A METHOD OF USE THEREOF FOR CONCENTRATING SEDIMENT IN A WATER TANK

(71) Applicant: Leigh Maxwell, Hammondville (AU)

(72) Inventor: Leigh Maxwell, Hammondville (AU)

( * ) Notice: Subject to any disclaimer, the term of this patent is extended or adjusted under 35 U.S.C. 154(b) by 153 days.

(21) Appl. No.: 17/309,251

(22) PCT Filed: Nov. 13, 2019

(86) PCT No.: PCT/AU2019/051245
§ 371 (c)(1),
(2) Date: May 12, 2021

(87) PCT Pub. No.: WO2020/097678
PCT Pub. Date: May 22, 2020

(65) Prior Publication Data
US 2022/0008841 A1 Jan. 13, 2022
US 2022/0008841 A1 Jan. 13, 2022

(30) Foreign Application Priority Data
Nov. 13, 2018 (AU) .................................. 2018904303

(51) Int. Cl.
*B01D 21/24* (2006.01)
*B01D 21/00* (2006.01)
(Continued)

(52) U.S. Cl.
CPC ...... *B01D 21/2411* (2013.01); *B01D 21/0012* (2013.01); *B01D 21/2405* (2013.01);
(Continued)

(58) Field of Classification Search
CPC ............ B01D 21/0012; B01D 21/2411; B01D 21/265; B01D 21/267; B04C 5/02; B04C 5/04; E03F 5/0403; E03F 5/14
(Continued)

(56) References Cited

U.S. PATENT DOCUMENTS 1,651,246 A * 11/1927 Bell .................... B01D 17/0208
210/512.1
5,725,760 A * 3/1998 Monteith .................. E03F 5/16
210/532.1
(Continued)

FOREIGN PATENT DOCUMENTS

KR          101304128 B1    9/2013
WO          2003097967 A1   11/2003

OTHER PUBLICATIONS

International Search Report & Written Opinion dated Jan. 31, 2020 from PCT Application No. PCT/AU2019/051245.

*Primary Examiner* — Christopher Upton
(74) *Attorney, Agent, or Firm* — Innovation Capital Law Group, LLP; Vic Lin

(57) ABSTRACT

A method of concentrating sediment in a water tank involves attaching a vortex inducing device to an opening through the roof of the tank between the central vertical axis and the side walling of the tank. The device has a device inlet which narrows to a device outlet. The device outlet is orientated such that, water flowing out via the device outlet induces a vortex within the pooled water, thereby causing sediment to collect centrally on the floor of the tank.

28 Claims, 2 Drawing Sheets

(51) Int. Cl.

| | | |
|---|---|---|
| *B01D 21/26* | (2006.01) | |
| *B04C 5/02* | (2006.01) | |
| *B04C 5/04* | (2006.01) | |
| *B04C 9/00* | (2006.01) | |
| *B65D 88/54* | (2006.01) | |
| *B67C 11/00* | (2006.01) | |
| *C02F 1/38* | (2023.01) | |
| *E03B 3/02* | (2006.01) | |
| *C02F 1/00* | (2023.01) | |
| *C02F 103/00* | (2006.01) | |

(52) U.S. Cl.
CPC ............ *B01D 21/265* (2013.01); *B04C 5/02* (2013.01); *B04C 5/04* (2013.01); *B04C 9/00* (2013.01); *B65D 88/54* (2013.01); *B67C 11/00* (2013.01); *C02F 1/385* (2013.01); *E03B 3/02* (2013.01); *B04C 2009/002* (2013.01); *C02F 2001/007* (2013.01); *C02F 2103/001* (2013.01); *C02F 2301/026* (2013.01)

(58) Field of Classification Search
USPC .......... 210/788, 801, 307, 512.1, 519, 532.1
See application file for complete search history.

(56) References Cited

U.S. PATENT DOCUMENTS

| | | | | |
|---|---|---|---|---|
| 6,276,537 | B1* | 8/2001 | Esler | B01D 21/2405 210/519 |
| 6,319,397 | B1* | 11/2001 | Su | E03F 5/0405 210/532.1 |
| 6,919,033 | B2* | 7/2005 | Stark | B01D 21/2411 210/801 |
| 7,422,683 | B2* | 9/2008 | Park | E03F 5/14 210/519 |
| 8,746,463 | B2* | 6/2014 | Cobb | B01D 21/2411 210/512.1 |
| 2006/0043010 | A1* | 3/2006 | Faram | E03F 5/14 210/512.1 |
| 2007/0102351 | A1* | 5/2007 | Lilley | E03F 5/16 210/532.1 |
| 2009/0020466 | A1* | 1/2009 | Williams | E03F 5/14 210/519 |
| 2014/0202941 | A1 | 7/2014 | Iacovacci | |
| 2018/0245327 | A1 | 8/2018 | Babcanec et al. | |

* cited by examiner

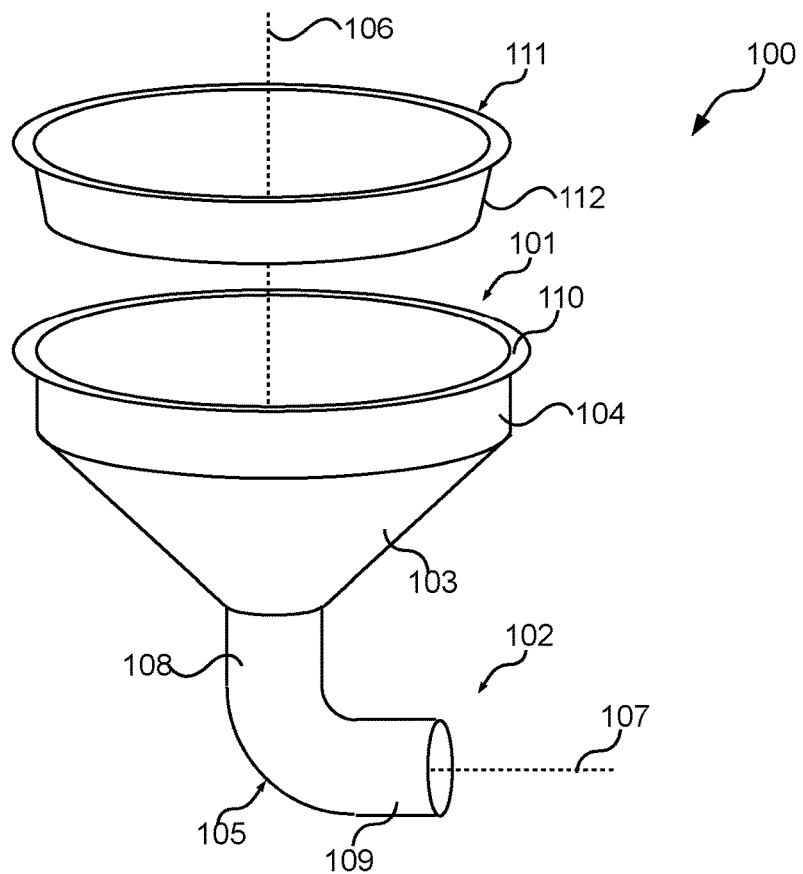
Figure 1
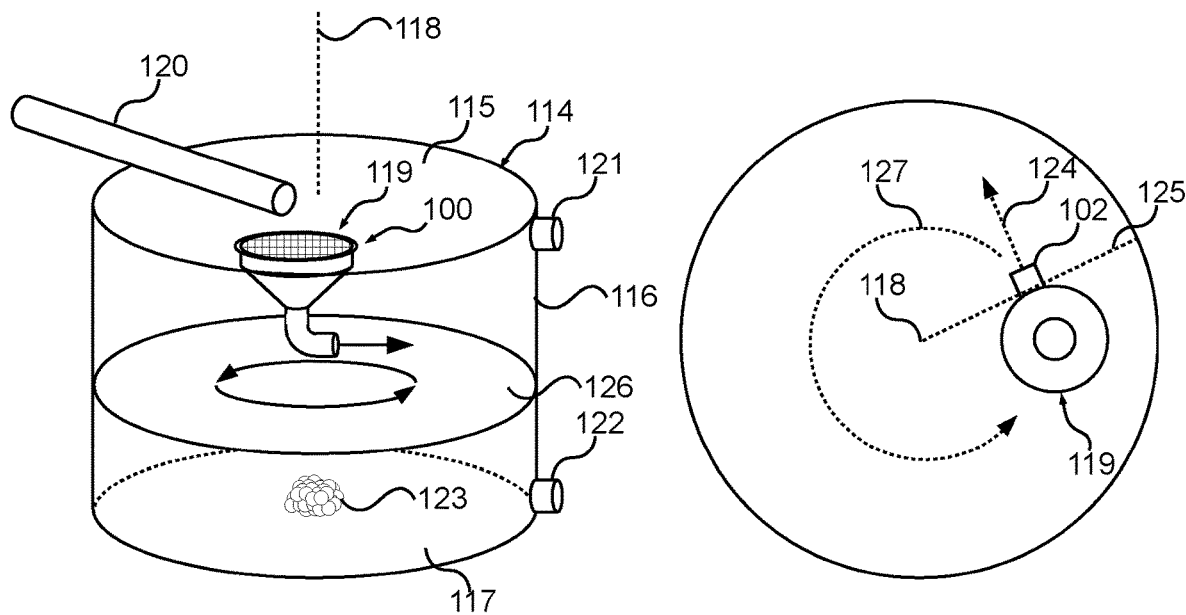
Figure 2
Figure 3

VORTEX INDUCING DEVICE AND A METHOD OF USE THEREOF FOR CONCENTRATING SEDIMENT IN A WATER TANK

FIELD OF THE INVENTION

This invention relates generally to a vortex inducing device and a method of use thereof for concentrating sediment in a water tank.

BACKGROUND OF THE INVENTION

Water tank sediment accretion requires periodic removal, lest it block water tank outlets, foul water pumps, or affect water quality. Removal typically entails use of a suction hose inserted into the tank and manipulated across the tank floor of the tank by an operator outside or within the tank. Hose suction however is time-consuming and wastes water.

KR 101304128 B1 (KU JAE WON et al.) 5 Sep. 2013 [hereinafter referred to as D1] discloses a system for removing debris flowing within a gutter by using a non-powered filtration device which includes a rotating drum therein which collect debris thereon and which is scraped off using a rake for collection in a bin.

US 2018/0245327 A1 (ADVANCED DRAINAGE SYSTEMS, INC.) 30 Aug. 2018 [hereinafter referred to as D2] discloses a device for removing particulates from stormwater runoff which has a partitioning portion having a first region including a funnel shape with a sump inlet aperture and a second region including a sump outlet aperture which reduces resuspension problems by reducing the speed of the vortex and creating a long laminar liquid flow path.

It is to be understood that, if any prior art information is referred to herein, such reference does not constitute an admission that the information forms part of the common general knowledge in the art, in Australia or any other country.

SUMMARY OF THE DISCLOSURE

There is provided herein a vortex inducing device for concentrating sediment accretion within a water tank away from tank outlets and aiding the removal thereof.

Specifically, for a water tank comprising a floor, side walling and a roof and defining a central vertical axis, the method comprises attaching the vortex inducing device to an opening through the roof. The opening is located away from the central vertical axis, that is, between the central vertical axis and the side walling in a horizontal plane.

The device comprises a device inlet and a device outlet defining device inlet and device outlet axes respectively. The device outlet axis is angled with respect to the device inlet axis. The device may narrow from the device inlet to the device outlet.

The method comprises inserting the device into the roof entrance. The device may comprise a rim to engage the entrance and, in embodiments, the device outlet does not extend further beyond the maximum diameter of the device inlet such that the device can be dropped into the entrance in place.

The method comprises orientating the device outlet in an outlet direction between 0° and 180° with respect to a tank radial axis. The device inlet may comprise a circular cross-section such that the device may be turned in situ to orientate the device outlet and the device inlet may comprise an indication indicative of the outlet direction viewable from above.

As such, in use, rainwater flows in via the device inlet and flows out via the device outlet as device outflow in the outlet direction.

As a device outflow comprises a horizontal flow vector component imparted by the angle of the device outlet with respect to the device inlet, when flowing into a pool of water within the tank at a location between the central vertical axis and the side walling and in the outflow direction between 0° and 180° with respect to the tank radial axis, the device outflow induces a vortex within the tank, which, over time, causes sediment to collect centrally on the floor of the tank at the central vertical axis. This observed effect is surprising in that the induced vortex is generally slight and almost imperceptible but, which over time, causes a sediment to concentrate centrally.

This central accretion keeps sediment away from tank outlets, typically located at the periphery of the floor. Furthermore, the central accretion can be more easily removed using a suction hose.

Unlike the arrangement of D1 which seeks to filter rainwater prior introduction to a rain tank or the like, the present arrangement concentrates debris already within a water tank, including very fine particulate sediment.

According to one aspect, there is provided a method of concentrating sediment in a water tank, the water tank comprising a floor, side walling and a roof, the tank defining a central vertical axis, the method comprising attaching a vortex inducing device to an opening through the roof, the opening being located between the central vertical axis and the side walling, the device comprising a device inlet and a device outlet, the device narrowing from the device inlet to the device outlet, the device inlet defining a device inlet axis, the device outlet defining a device outlet axis, wherein the method comprises orientating the device outlet in an outlet direction between 0° and 180° with respect to a tank radial axis, such that, in use, water flows in via the device inlet and flows out via the device outlet as device outflow in the outlet direction and wherein the device outlet axis is angled with respect to the device inlet axis such that the device outflow includes a horizontal flow component which, by flowing into pooled water within the tank between the central vertical axis and the side walling in the outflow direction between 0° and 180° with respect to the tank radial axis, induces a vortex within the pooled water, thereby causing sediment to collect centrally on the floor of the tank.

The outlet direction may be between 45° and 135° with respect to the tank radial axis.

The outlet direction may be approximately 90° with respect to the tank radial axis.

The device outlet axis may be greater than 0° with respect to the device inlet axis.

The device outlet axis may be greater than 30° with respect to the device inlet axis.

The device outlet axis may be greater than 45° with respect to the device inlet axis.

The device outlet axis may be approximately 70° with respect to the device inlet axis.

The device inlet may comprise a circular cross-section.

The device inlet may comprise an indication indicative of the outlet direction.

The device may comprise a funnelled section decreasing in diameter from the device inlet.

The funnelled section may lead to an outlet pipe defining the device outlet.

In one embodiment, the outlet pipe does not extend beyond a maximum diameter of the device inlet.

The outlet pipe may comprise a downpipe coaxial with the device inlet axis.

The outlet pipe may angle away from the device inlet axis way to an outlet pipe.

The outlet pipe may be coaxial with the device outlet axis.

The device may comprise a rim around the device inlet.

The device inlet may comprise a diameter less than 400 mm and the rim may comprise a diameter greater than 400 mm.

The device inlet may comprise a diameter less than 500 mm and the rim may comprise a diameter greater than 500 mm.

The rim may extend downwardly at an outer periphery thereof.

The method may comprise fitting a screen insert within the device inlet and which may comprise a screen therein.

The screen insert may comprise a rim.

The device may comprise an upper component which attaches to an outlet pipe.

The upper component may comprise a connection which connects to the outlet pipe and wherein the connection may comprise an outer collar and an inner collar.

The outlet pipe may comprise fastener aperture flanges which correspond in location with fastener aperture flanges of the upper component.

The outlet pipe may diminish in diameter towards the device outlet.

The outlet pipe may diminish in diameter from approximately 130 mm to 90 mm towards the device outlet.

The outlet pipe may transition through an angle of approximately 30°.

The outlet pipe may comprise a vertical length of greater than 400 mm.

The outlet pipe may comprise a vertical length of greater than 500 mm.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIG. 1 shows a top perspective view of a vortex inducing device used for concentrating sediment within water tanks;

FIG. 2 illustrates a top perspective view illustrating the engagement of the device within an opening of a water tank;

FIG. 3 illustrates a top plan view of the water tank illustrating a vortex induced by the device;

DESCRIPTION OF EMBODIMENTS

Figure 4:
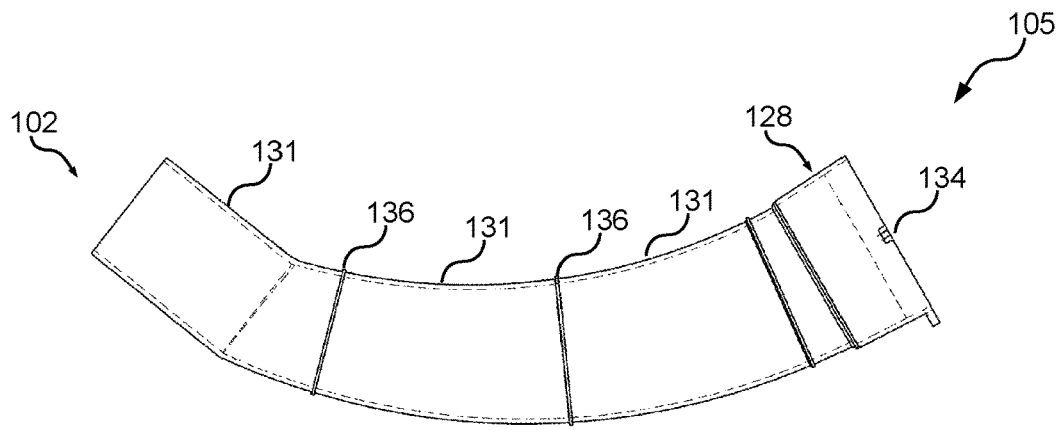
FIG. 4 shows an outlet pipe of the device in accordance with an embodiment.

A vortex inducing device 100 comprises a device inlet 101 and a device outlet 102. The device 100 may be made from plastic.

The device 100 may narrow from the device inlet 101 to the device outlet 102. The device 100 defines a device inlet axis 106 and a device outlet axis 107. The device outlet axis 107 comprises a horizontal component. In the embodiment shown, the device outlet axis 107 is 90° with respect to the device inlet axis 106. However, in embodiments, the device outlet axis 107 may be greater than 0° with respect to the central vertical axis 106 so as to induce a horizontal flow component in the manner described hereunder. In embodiments, the device out of axis 106 is approximately 20° below horizontal.

In embodiment shown in FIG. 1, the device 100 comprises a funnelled section 103 narrowing from a cylindrical section 104 to an outlet pipe 105.

The outlet pipe 105 may comprise a downpipe 108 coaxial with the device inlet axis 106 transitioning sideways to an outlet pipe 109 which may be coaxial with the device outlet axis 107.

The device 100 may comprise a rim 110 around the device inlet 101.

In embodiments, the device 100 comprises a screen insert 111 which may comprise a cylindrical or frustoconical section 112 which fits within the device inlet 101 and which comprises a screen therein to catch debris such as leaves. The screen insert 111 may comprise a rim 113.

FIG. 2 shows a water tank 114 which may be cylindrical, although not necessarily, and which may be made of plastic. The tank 114 may be either of the above or below ground variety.

The tank 114 defines a roof 115, side walling 116 and a floor 117.

The tank 114 may define a central vertical axis 118. The roof 115 may comprise an opening 119 away from the central vertical axis 118, that is, between the central vertical axis 118 and the side walling 116 in a horizontal plane.

A run-off pipe 120 may direct rainwater into the opening 119.

The tank 114 may comprise an overflow outlet 121 and a drain 122.

A method for concentrating sediment 123 in the water tank 114 comprises attaching the device 100 to the opening 119. The device 100 may be sized such that the device 100 can be dropped into the opening 119 wherein the peripheral rim 110 thereof catches the edge of the opening 119, thereby holding the device 100 in place. In embodiments, the outlet pipe 109 does not extend beyond the edge of the cylindrical section 104 such that the device 100 can be dropped into the opening 119 vertically.

With reference to FIG. 3, the method comprises orientating the device outlet 102 in an outlet direction 124 between 0° and 180° with respect to a radial tank axis 125.

As such, in use, rainwater flows in via the device inlet 101 and flows out via the device outlet 102 as device outflow in the outlet direction 124. As the device outlet 102 comprises a horizontal component, so too does the device outflow which, by flowing into a pool of water 126 within the tank 114 at a position between the central vertical axis 118 and the side walling 116 and in a direction between 0° and 180° with respect to the tank radial axis 125, thereby induces a slight vortex 127 within the tank 114, thereby causing sediment 123 to collect centrally on the floor 117 of the tank 114 at the central vertical axis 118 in the manner shown in FIG. 2.

Figure 5:
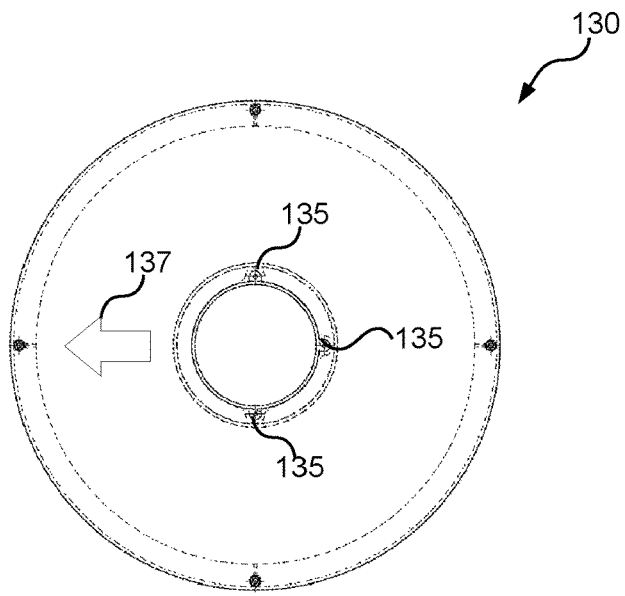
FIG. 5 shows a top plan view of an upper component of the device in accordance with an embodiment.
Figure 6:
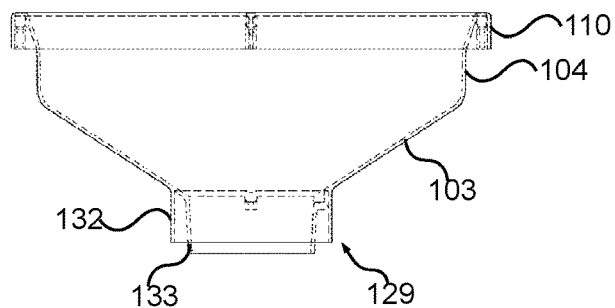
FIG. 6 shows a side cross-sectional elevation view of the upper component.

FIGS. 4-6 show the device 100 in accordance with an embodiment wherein FIG. 4 shows the outlet pipe 105 thereof and FIGS. 5 and 6 show an upper component 130 which attaches to the outlet pipe 105.

The outlet pipe 105 may be integrally moulded. In embodiments in FIG. 4, the outlet pipe 105 comprises a plurality of sections 131 and strengthening ribs 136 therebetween. In alternative embodiments, the outlet pipe 105 may be manufactured from separate injection moulded plastic tubular sections 131 which connect together in the manner shown in FIG. 4. Alternatively, The outlet pipe 105 may comprise a connection 128 which engages a connection 129 of the upper component 130. The connection 129 may comprise an outer collar 132 for the connection of a larger diameter outlet pipe 105 of approximately 150 mm for large inflow application and an inner collar 133 the connection of smaller diameter outlet pipes 105.

The connection 128 may comprise fastener aperture flanges 134 which correspond in location with fastener aperture flanges 135 of the upper component 130 such that the upper pipe 105 may be connected to the upper component 130 using fasteners such as screws.

The outlet pipe 105 may diminish from approximately 130 mm to 90 mm towards the device outlet 102.

The outlet pipe 105 shown in FIG. 4 transitions through an angle of approximately 30°. Furthermore, the outlet pipe 105 may comprise a vertical length greater than 400 mm or 500 mm in embodiments and, in accordance with the embodiment shown in FIG. 4, the vertical length may be approximately 520 mm.

The upper component 130 may be sized in two varieties so as to fit within openings 119 either of approximately 400 mm of 500 mm in diameter.

For the 400 mm variety, the rim 110 may comprise a diameter of greater than 400 mm whereas the cylindrical section 104 may comprise a diameter of less than 400 mm. For the 500 mm variety, the rim 110 may comprise a diameter of greater than 500 mm whereas the cylindrical section 104 may comprise a diameter of less than 500 mm.

In the embodiment shown in FIG. 6, the rim 110 extends downwardly so as to surround a vertical flange of the opening 119.

The device inlet 101 may comprise a comprise an indication 137 indicative of the outlet direction.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of concentrating sediment in a water tank, the water tank comprising a floor, side walling and a roof, the tank defining a central vertical axis, the method comprising attaching a vortex inducing device to an opening through the roof, the opening being located between the central vertical axis and the side walling where the vortex inducing device fits through the opening and rests on a top side of the roof about the opening, the vortex inducing device comprising a device inlet and a device outlet, the device narrowing from the device inlet to the device outlet, the device inlet defining a device inlet axis, the device outlet defining a device outlet axis, wherein the method comprises orientating the device outlet in an outlet direction between 0° and 180° with respect to a tank radial axis, such that, in use, water flows in via the device inlet and flows out via the device outlet as device outflow in the outlet direction and wherein the device outlet axis is angled with respect to the device inlet axis such that the device outflow includes a horizontal flow component which, by flowing into pooled water within the tank between the central vertical axis and the side walling in the outflow direction between 0° and 180° with respect to the tank radial axis, induces a vortex within the pooled water, thereby causing sediment to collect centrally on the floor of the tank, wherein the device comprises a funnelled section decreasing in diameter from the device inlet, the funnelled section leading to an outlet pipe defining the device outlet that does not extend beyond a maximum diameter of the device inlet.

2. The method as claimed in claim 1, wherein the outlet direction is between 45° and 135° with respect to the tank radial axis.

3. The method as claimed in claim 1, wherein the outlet direction is approximately 90° with respect to the tank radial axis.

4. The method as claimed in claim 1, wherein the device outlet axis is greater than 0° with respect to the device inlet axis.

5. The method as claimed in claim 1, wherein the device outlet axis is greater than 30° with respect to the device inlet axis.

6. The method as claimed in claim 1, wherein the device outlet axis is greater than 45° with respect to the device inlet axis.

7. The method as claimed in claim 1, wherein the device outlet axis is approximately 70° with respect to the device inlet axis.

8. The method as claimed in claim 1, wherein the device inlet comprises a circular cross-section.

9. The method as claimed in claim 8, wherein the device inlet comprises an indication indicative of the outlet direction.

10. The method as claimed in claim 1, wherein the outlet pipe comprises a downpipe coaxial with the device inlet axis.

11. The method as claimed in claim 10, wherein the outlet pipe angles away from the device inlet axis to an outlet end of the outlet pipe.

12. The method as claimed in claim 11, wherein the outlet pipe is coaxial with the device outlet axis.

13. The method as claimed in claim 11, wherein the outlet pipe diminishes in diameter towards the device outlet.

14. The method as claimed in claim 13, wherein the outlet pipe diminishes in diameter from approximately 130 mm to 90 mm towards the device outlet.

15. The method as claimed in claim 11, wherein the outlet pipe transitions through an angle of approximately 30°.

16. The method as claimed in claim 11, wherein the outlet pipe comprises a vertical length of greater than 400 mm.

17. The method as claimed in claim 10, wherein the outlet pipe comprises a vertical length of greater than 500 mm.

18. The method as claimed in claim 1, wherein the device comprises a rim around the device inlet.

19. The method as claimed in claim 18, wherein the device inlet comprises a diameter less than 400 mm and the rim comprises a diameter greater than 400 mm.

20. The method as claimed in claim 18, wherein the device inlet comprises a diameter less than 500 mm and the rim comprises a diameter greater than 500 mm.

21. The method as claimed in claim 18, wherein the rim extends downwardly at an outer periphery thereof.

22. The method as claimed in claim 1, further comprising fitting a screen insert within the device inlet and which comprises a screen therein.

23. The method as claimed in claim 22, wherein the screen insert comprises a rim.

24. The method as claimed in claim 1, wherein the device comprises an upper component which attaches to an outlet pipe, the upper component fitting around the funnelled section.

25. The method as claimed in claim 24, wherein the upper component comprises a connection which connects to the outlet pipe and wherein the connection comprises an outer collar and an inner collar.

26. The method as claimed in claim 25, wherein the outlet pipe comprises fastener aperture flanges which correspond in location with fastener aperture flanges of the upper component.

27. A method of concentrating sediment in a water tank, the water tank comprising a floor, side walling and a roof, the tank defining a central vertical axis, the method comprising attaching a vortex inducing device to an opening through the roof, the opening being located between the central vertical axis and the side walling, the device comprising a device inlet and a device outlet, the device narrowing from the device inlet to the device outlet, the device inlet defining a device inlet axis, the device outlet defining a device outlet axis, wherein the method comprises orientating the device outlet in an outlet direction between 0° and 180° with respect to a tank radial axis, such that, in use, water flows in via the device inlet and flows out via the device outlet as device outflow in the outlet direction and wherein the device outlet axis is angled with respect to the device inlet axis such that the device outflow includes a horizontal flow component which, by flowing into pooled water within the tank between the central vertical axis and the side walling in the outflow direction between 0° and 180° with respect to the tank radial axis, induces a vortex within the pooled water, thereby causing sediment to collect centrally on the floor of the tank, wherein the device inlet comprises a circular cross-section that permits a user to perform the step of orientating the device outlet in an outlet direction after the vortex inducing device is placed into the opening.

28. A method of concentrating sediment in a water tank, the water tank comprising a floor, side walling and a roof, the tank defining a central vertical axis, the method comprising attaching a vortex inducing device to an opening through the roof, the opening being located between the central vertical axis and the side walling, the device comprising a device inlet and a device outlet, the device narrowing from the device inlet to the device outlet, the device inlet defining a device inlet axis, the device outlet defining a device outlet axis, wherein the method comprises orientating the device outlet in an outlet direction between 0° and 180° with respect to a tank radial axis, such that, in use, water flows in via the device inlet and flows out via the device outlet as device outflow in the outlet direction and wherein the device outlet axis is angled with respect to the device inlet axis such that the device outflow includes a horizontal flow component which, by flowing into pooled water within the tank between the central vertical axis and the side walling in the outflow direction between 0° and 180° with respect to the tank radial axis, induces a vortex within the pooled water, thereby causing sediment to collect centrally on the floor of the tank wherein the device comprises a funnelled section decreasing in diameter from the device inlet, funnelled section leads to an outlet pipe defining the device outlet, and the outlet pipe is formed with a single continuous smooth bend.

\* \* \* \* \*